Division A.

H. F. Read's

4391

Screw Propellor for Meters.

REISSUED MAY 23 1871

Witnesses:
Eugene C. Adams
J. Mel Wagner

Inventor:
National Meter Company
assignees of H. F. Read
By Johnson, Klauske & Co
their Attorneys

United States Patent Office.

NATIONAL METER COMPANY, OF NEW YORK, N. Y., ASSIGNEES OF HENRY F. READ.

Letters Patent No. 92,884, dated July 20, 1869; reissue No. 4,391, dated May 23, 1871.

DIVISION A.

IMPROVEMENT IN SCREW-PROPELLERS FOR WATER-METERS.

The Schedule referred to in these Letters Patent and making part of the same.

HENRY F. READ, of Brooklyn, in the county of Kings and State of New York, did invent a new and useful Improvement in Screw-Propellers for Liquid-Meters, which he assigned to the NATIONAL METER COMPANY, of New York city, and of which the following is a description.

The nature of the invention consists in constructing a screw-propeller for liquid-meters of hard rubber, or other suitable material, by casting the same in suitable metal molds.

In the drawing—

Figure 4:
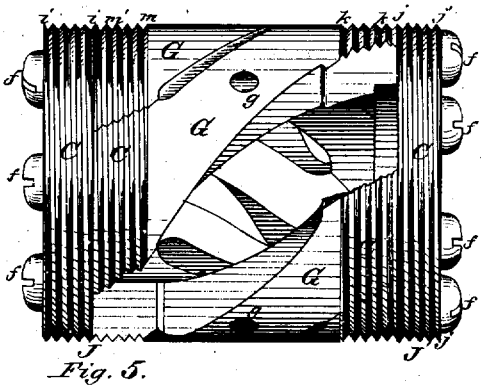

Figure 4 presents a side view, on a double scale, of the mold, with one of the spiral segments G removed, in order to present a better view of its peculiar form.

Figure 5:
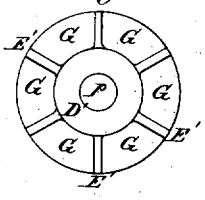

Figure 5 presents a cross-sectional view of the mold, without the cap, taken through the line *x y*, fig. 4.

Figure 6:
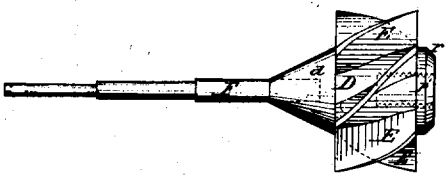

Figure 6 shows a perspective view of screw-propeller when cast.

Figure 7:
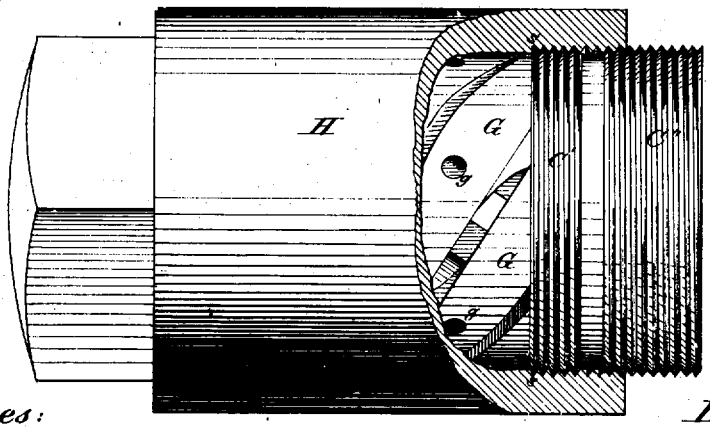

Figure 7 shows a different construction of the mold, with a part of the cap broken away.

The screw-propeller is preferably cast of soft rubber in metal molds, which soft rubber is then hardened in the mold by heat, or any other suitable process now in use, so that, when the propeller is taken from the mold it is ready for use, with the exception of polishing, &c.

Although it is preferred to make the propeller of rubber, any other substance that can be molded may be used, if such substance is suitable for use in a liquid-meter.

In figs. 1, 2, 3, 4, 5, and 7 are shown the mold and its parts which are used in the casting, and which form the subject-matter of separate and distinct Letters Patent bearing even date herewith, but which are hereinafter fully described, to enable others skilled in the art to which this invention appertains to fully understand the same.

In fig. 4 is shown the body of the mold, with one of the spiral segments G removed. Its interior hollow is uniform in size from one end to the other.

Upon each end is cut a male screw, C C C C. It is composed of several different parts.

The sections from *j* to *j′* and from *i* to *i′* are collars, J and J′, which are made fast to the main body by means of the screws *f*.

Figure 2:
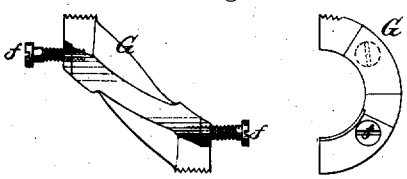
Figure 2, two different views of a spiral segment detached, in order to display its peculiar form.

Each of these sections is made with a flange, *n*, extending inward from its inner edge, to act as a guide and support to the spiral segments while the screws are being screwed into them. The form of these segments is shown in figs. 2 and 4. Each one has a female screw in each end. The holes *g* do not extend through, but only a sufficient depth for the insertion of a suitable tool by which to remove the segments when the cast is made.

The spiral slots E′ are formed by cutting away equal portions of adjacent segments, and all are to be as nearly of the same form and capacity as practicable, for these slots are to give form to the wings E of the screw-propeller, shown in fig. 6.

When these segments are fitted together upon the collars, and the screws *f* are driven home, it is ready for the caps A and A′, and the devices seated in them, respectively.

Figure 1:
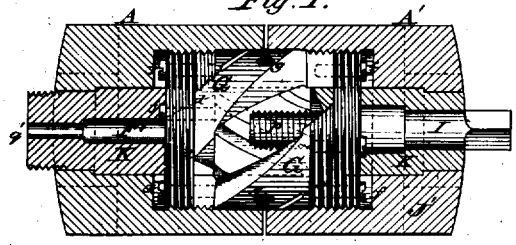
Figure 1 represents a vertical section of the caps A A′, embracing the mold, with one of the spiral segments removed in order to expose the interior to view.
Figure 3:
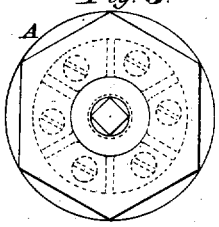
Figure 3 shows an end view of one of the caps A.

It will appear from fig. 1 that the cap A′ is provided, in the interior of its main opening, with a female screw to fit the male thread on the end of the mold, and that above the end of the mold the diameter of the opening is suddenly reduced, and, after continuing at the reduced diameter, it is again reduced, and so continues to the end; and that the plunger K from *j′* upward has a corresponding formation, so that it may be moved downward but not upward; and the part extends into the interior of the molds, and its end is made concave, so as to give the convex form on the large end *r* of the body of the propeller, as shown in fig. 6; and its interior is recessed to fit the shoulder on the steel mandrel I, so that the mandrel may move downward but not upward when once in position.

The lower end of the mandrel is provided with a male screw-thread, *p*, upon which is formed the female screw *p′* in the large end of the screw-propeller.

When these parts are in position the cap A′ is screwed upon the upper end of the mold.

The cap A is also provided with a female screw so as to screw over the lower end of the mold, and its plunger is so formed that it will play upward but not downward; and its lower end is formed with a male screw-thread, over which a nut is to be screwed; and the bore in the interior of the plunger has the form indicated by F′ in fig. 1, to fit over the steel shaft F in fig. 6; and at the upper end is gradually enlarged, as shown by the dotted lines *d′ d′*, fig. 1, forming a conical recess to mold the conical portion of the screw-propeller, as shown in fig. 6.

When the cap A is provided with the described parts, it is screwed upon the lower end of the mold and ready for use.

The upper end of the shaft F may be provided with a male screw-thread, so that the shaft may be screwed into the body of the propeller.

The female screw in the large end is made for the reception of a bushing to hold in position an agate or other hard substance, to receive the pivot on which the propeller revolves.

When all the parts are complete the cap A, with its plunger and mandrel, is removed, and a proper quantity of the prepared rubber inserted in the mold through the upper opening, and the cap A′, with its before-mentioned parts, is screwed down over the mold, and in so doing the rubber is forced out into the slots E′ and into the conical portion of the lower plunger, and is cast in the form in fig. 6. It is then, while in the mold, hardened by any of the processes now in use.

In fig. 7, where a different construction is shown, the cap H incloses the entire mold.

The spiral segments G G are cut off at S S, corresponding to the line *x y* in fig. 4; and C′ represents the female screw in the interior of cap H; while C″ is a collar with a male screw-thread upon it to fit the female screw in the cap H, and contains the plunger and steel mandrel contained in the cap A′.

When it is removed the rubber is introduced into the mold, and then the collar C″ is screwed down and the cast is made, after which it is screwed out, and the screw-propeller may be, by the requisite draft on the wings and body, forced out of the mold from below.

The manufacture of both body and wings of screw-propellers of rubber and in one piece, by casting in a mold, is deemed an improvement of great value, since the rubber, when vulcanized, is very light and strong. A propeller made of this material, because of its lightness, will revolve upon the slightest action of the passing fluid, and will thus indicate with the greatest accuracy.

The vulcanized rubber, while very strong, is yet slightly elastic, so that if sprung out of form by any extraordinary force it will, when that pressure is removed, resume its original shape without breaking, as cast metal would not do.

It is not acted upon chemically by water, so that it does not render the water impure, and retains its polish, so that it will not become loaded and clogged with dirt and sand, which would increase its weight, roughen its surface, and thus render its indications untrue.

Screw-propellers for meters have heretofore been constructed, generally, of metal, each wing and the body in separate pieces, and the wing soldered upon the body with some soft metal, and are much heavier than those made of rubber, and not, therefore, nearly so sensitive to the action of the fluid, and, of course, are liable to spring out of shape and be torn off by centrifugal force, so that much labor and expense are necessary to keep them repaired and in true form.

What is claimed under this patent as the invention of HENRY F. READ is—

1. A screw-propeller for liquid-meters, made in a metallic mold, essentially as described.

2. A screw-propeller for liquid-meters, having its body, spiral vanes or wings E, and interior screw-threads cast at one and the same operation, essentially as described.

3. A hard rubber screw-propeller for liquid-meters, as described, as a new article of manufacture.

NATIONAL METER COMPANY.
JOHN C. KELLEY, *Prest.*

Witnesses:
EUGENE C. ADAMS,
J. WEST WAGNER.